(12) United States Patent
Lin

(10) Patent No.: US 7,341,194 B2
(45) Date of Patent: Mar. 11, 2008

(54) ADAPTER CARD

(75) Inventor: Chih-Chien Lin, Hsi Chih (TW)

(73) Assignee: Chant Sincere Co., Ltd., Taipei Hsien (TW)

( * ) Notice: Subject to any disclaimer, the term of this patent is extended or adjusted under 35 U.S.C. 154(b) by 218 days.

(21) Appl. No.: 11/201,215

(22) Filed: Aug. 11, 2005

(65) Prior Publication Data

US 2007/0034699 A1 Feb. 15, 2007

(51) Int. Cl.
*G06K 7/00* (2006.01)

(52) U.S. Cl. .................. 235/486; 235/441; 235/380; 439/60

(58) Field of Classification Search .......... 235/486, 235/441, 451, 492, 380; 439/630, 60
See application file for complete search history.

(56) References Cited

U.S. PATENT DOCUMENTS

| | | | |
|---|---|---|---|
| 7,044,757 B1* | 5/2006 | Yen | 439/138 |
| 7,070,453 B1* | 7/2006 | Chen | 439/630 |
| 7,097,512 B1* | 8/2006 | Hsiao et al. | 439/630 |
| 2003/0133270 A1* | 7/2003 | Liu et al. | 361/728 |
| 2004/0070952 A1* | 4/2004 | Higuchi et al. | 361/737 |
| 2005/0079765 A1* | 4/2005 | Ho et al. | 439/630 |
| 2005/0227520 A1* | 10/2005 | Wu | 439/159 |
| 2006/0003609 A1* | 1/2006 | Hwang | 439/76.1 |
| 2006/0009078 A1* | 1/2006 | Chen | 439/630 |
| 2006/0071313 A1* | 4/2006 | Kuo et al. | 257/679 |
| 2007/0018297 A1* | 1/2007 | Koh | 257/679 |
| 2007/0080224 A1* | 4/2007 | Kou et al. | 235/441 |

\* cited by examiner

*Primary Examiner*—Steven S. Paik
(74) *Attorney, Agent, or Firm*—Bacon & Thomas, PLLC

(57) ABSTRACT

An adapter card for receiving a mini MMC memory card to form a SD memory card is disclosed to include a housing formed of a top cover shell and a bottom cover shell, and a terminal holder set, which includes an electrically insulative holder block, and a plurality of terminals formed integral with a material bar and bonded with the material bar to the electrically insulative holder block by insert-molding and cut off from the material bar after insert-molding.

4 Claims, 4 Drawing Sheets

ADAPTER CARD

BACKGROUND OF THE INVENTION (a) Field of the Invention

The present invention relates to an adapter card and more particularly, to such an adapter card that is designed for use with a mini MMC memory card to form a SD memory card.

(b) Description of the Prior Art

A mini MMC memory card and a SD memory card have different configurations that fit different insertion slots. Most commercial electronic apparatus (such as desktop computer, notebook computer, PDA, digital camera, cellular telephone, electronic dictionary, MP3 player, and etc.) are equipped with a SD memory card insertion slot, imparting a barrier to the promotion of mini MMC memory card.

SUMMARY OF THE INVENTION

The present invention has been accomplished under the circumstances in view. It is the main object of the present invention to provide an adapter card that is designed for use with a mini MMC memory card to form a SD memory card. According to one aspect of the present invention, the adapter card is designed for receiving a mini MMC memory card to form a SD memory card, comprising a housing formed of a top cover shell and a bottom cover shell, and a terminal holder set mounted inside the housing. The terminal holder set comprises an electrically insulative holder block, and a plurality of terminals formed integral with a material bar and bonded with the material bar to the electrically insulative holder block by insert-molding and cut off from the material bar after insert-molding. According to another aspect of the present invention, the top cover shell and the bottom cover shell are bonded together by an ultrasonic heat sealing apparatus after mounting of the terminal holder set in between the top cover shell and the bottom cover shell.

DETAILED DESCRIPTION OF THE PREFERRED EMBODIMENTS

Figure 1:
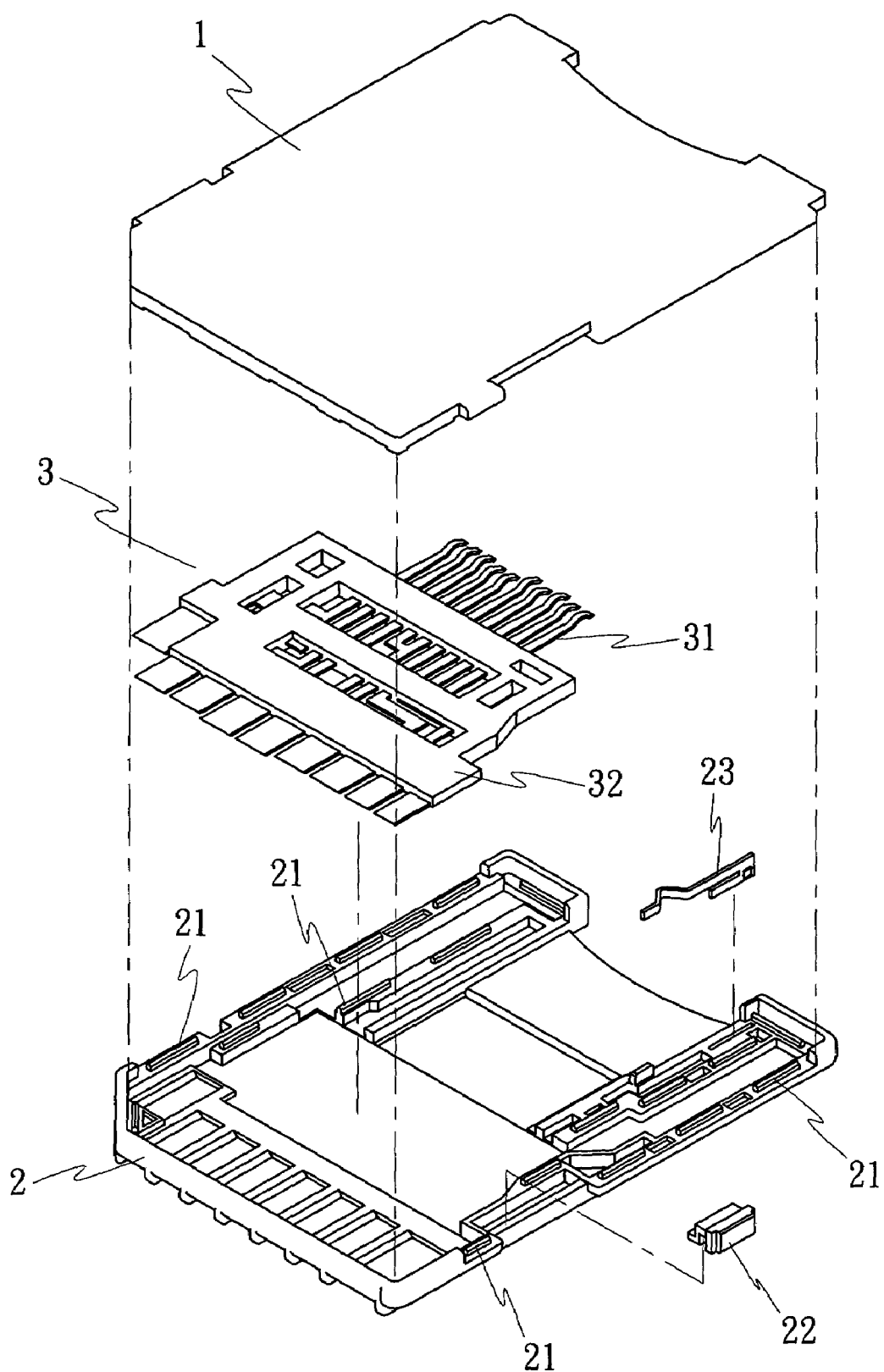
FIG. 1 is an exploded view of an adapter card according to the present invention.

Referring to FIG. 1, an adapter card in accordance with the present invention is shown comprised of a top cover shell 1, a bottom cover shell 2, and a terminal holder set 3. The top cover shell 1 and the bottom cover shell 2 are fastened together, forming a SD memory card configuration and defining an insertion slot for receiving a mini MMC memory card 4.

Figure 2:
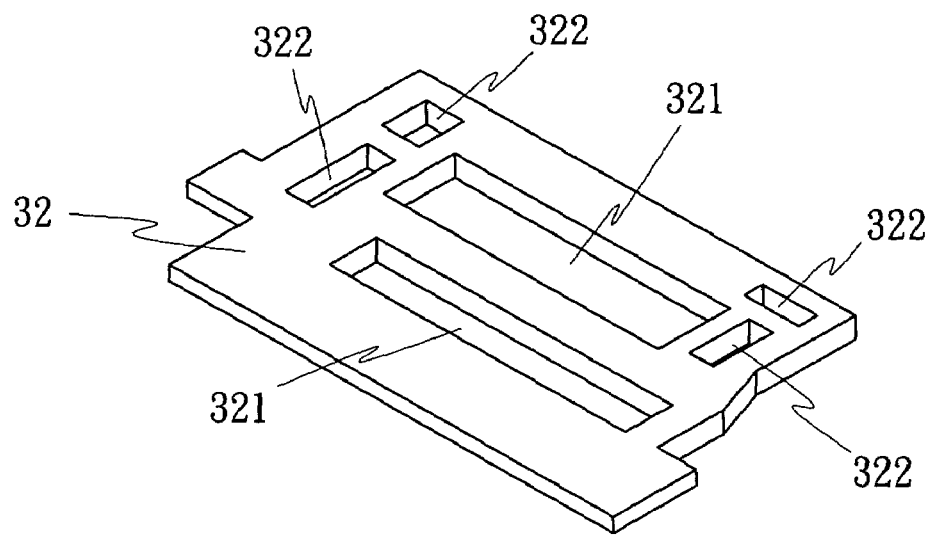
FIG. 2 is an elevational view of the electrically insulative terminal holder block for the terminal holder set of the adapter card according to the present invention.
Figure 3:
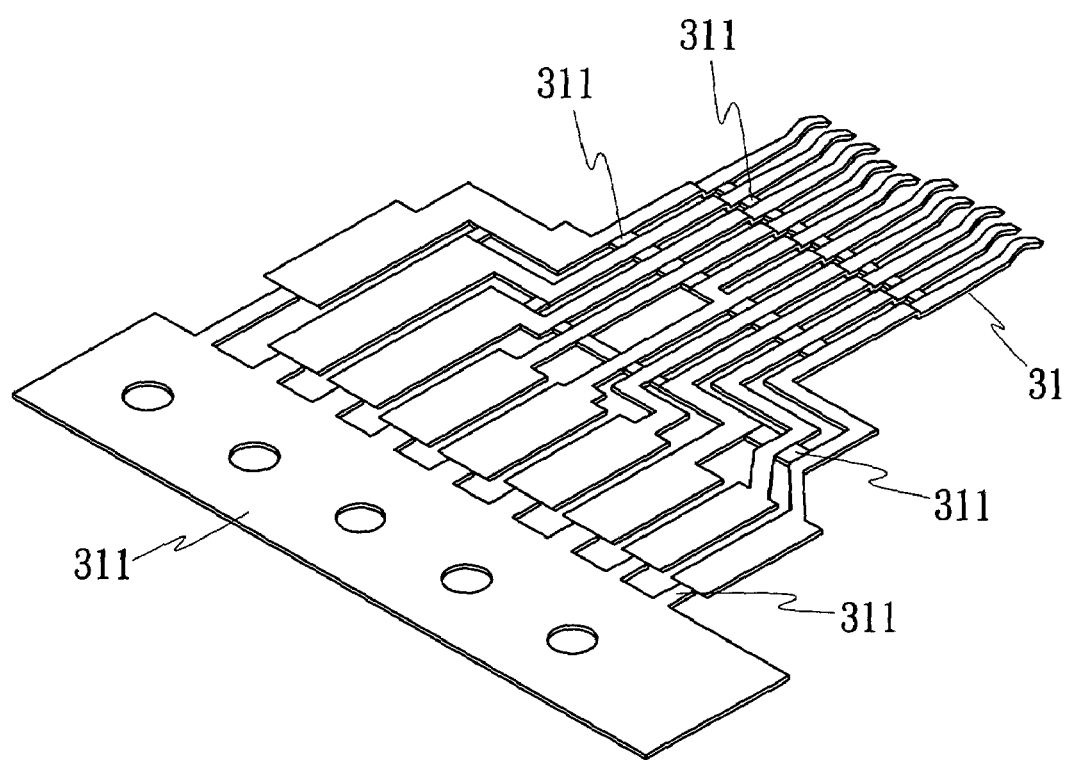
FIG. 3 illustrates the terminals formed integral with a material bar according to the present invention.
Figure 4:
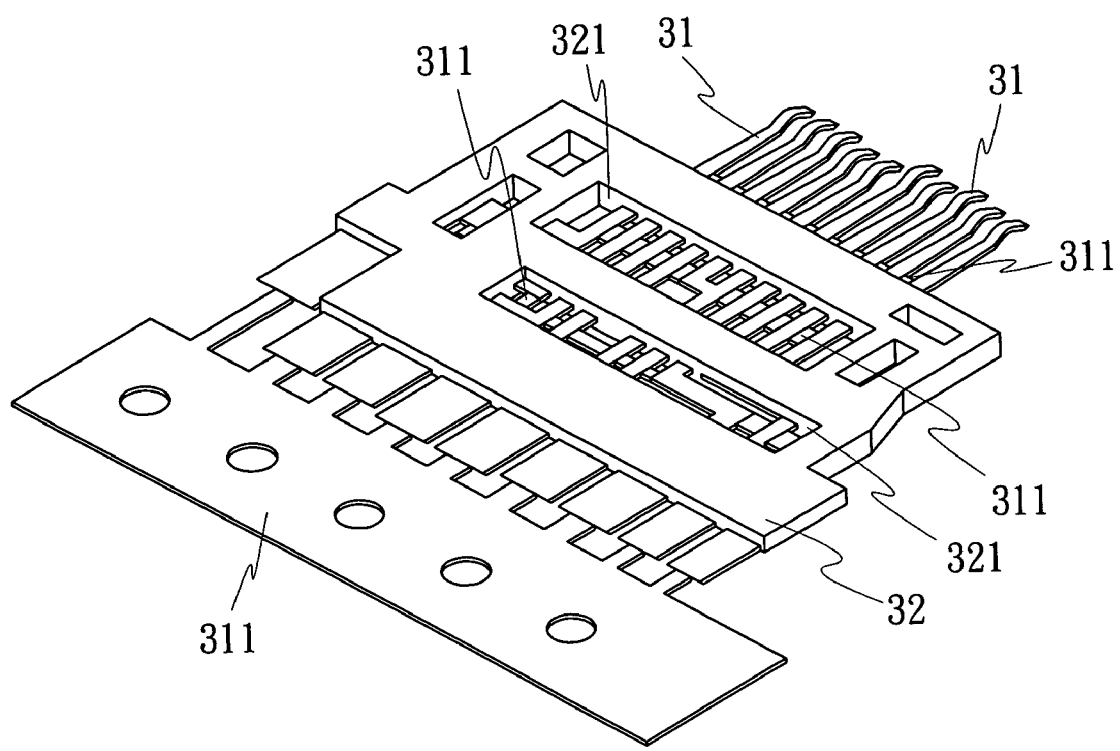
FIG. 4 illustrates the terminals with the integrated material bar bonded to the electrically insulative terminal holder block according to the present invention.
Figure 5:
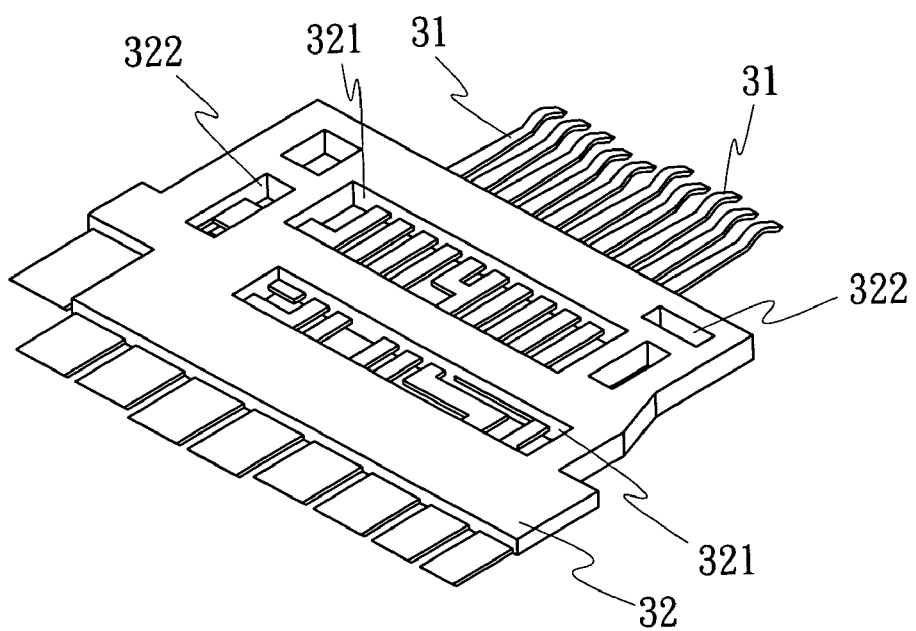
FIG. 5 is an elevational view showing the finished terminal holder set according to the present invention.

Referring to FIGS. 2 and 3 and FIG. 1 again, the terminal holder set 3 comprises a set of terminals 31, and an electrically insulative terminal holder block 32. The terminals 31 are respectively formed integral with a material bar 311 and bonded with the material bar 311 to the electrically insulative terminal holder block 32 by insert-molding (see FIG. 4). After insert-molding, the material bar 311 is cut off, forming the desired terminal holder set 3 (see FIG. 5).

Figure 6:
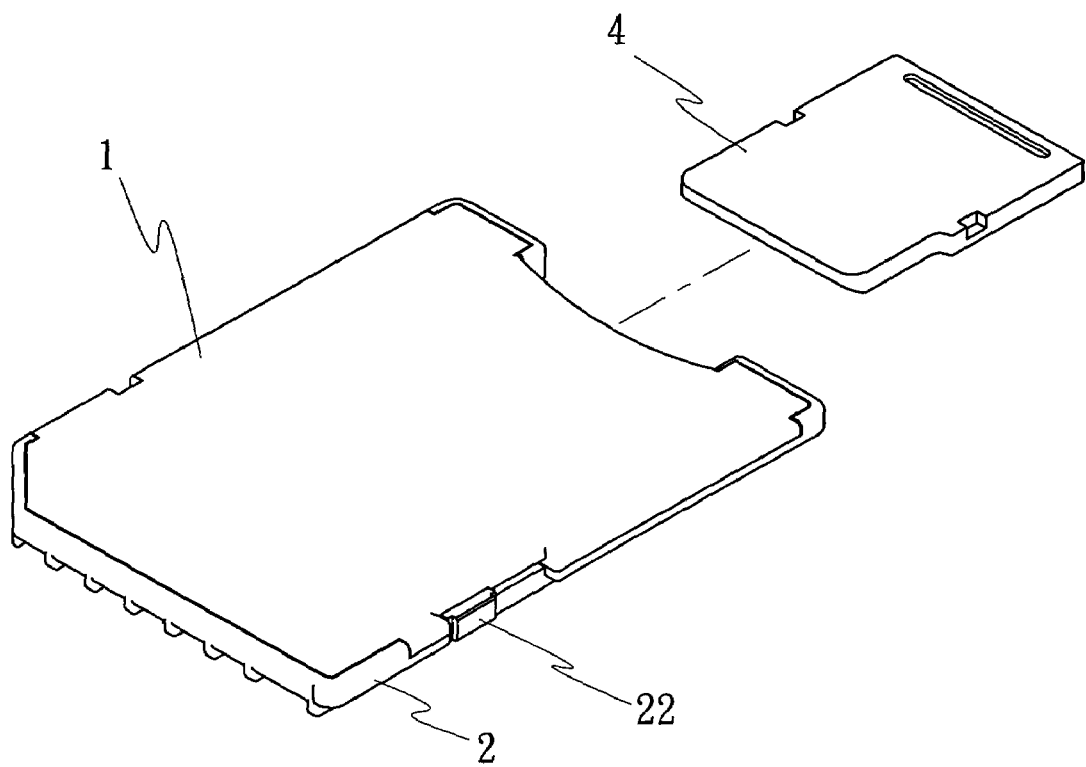
FIG. 6 is a schematic drawing showing the use of the present invention before insertion of a mini MMC memory card.
Figure 7:
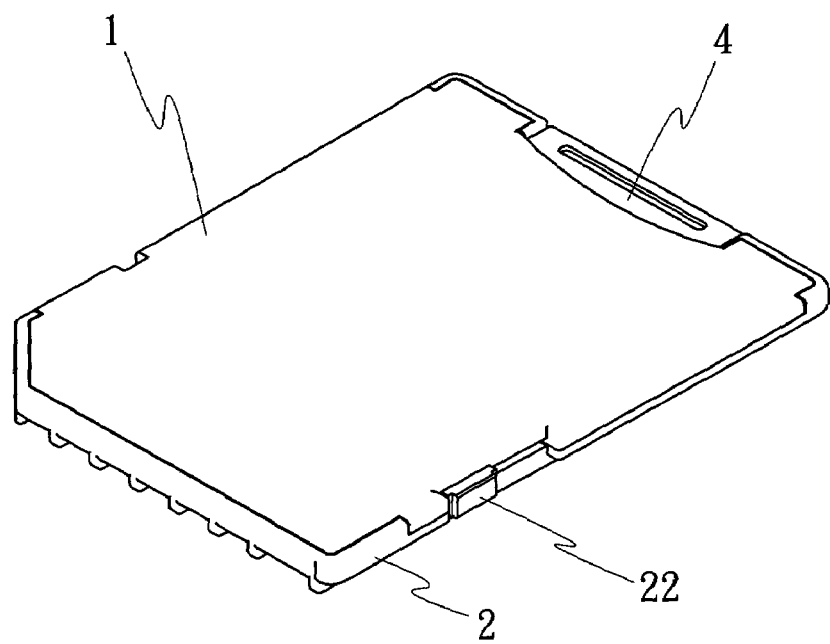
FIG. 7 corresponds to FIG. 6 showing the status of the adapter card after insertion of the mini MMC memory card.

Referring to FIGS. 6 and 7, the top cover shell 1 and the bottom cover shell 2 are fastened together to hold the terminal holder set 3 on the inside, thereby forming a SD memory card configuration. Therefore, a mini MMC memory card 4 can be inserted into the adapter card to form a SD memory card. Because the terminals 31 are bonded to the electrically insulative terminal holder block 32 by insert-molding, the terminals 31 are accurately positioned without biasing.

As indicated above, the aforesaid electrically insulative terminal holder block 32 is bonded with the terminals 31 and the material bar 311 by insert-molding to form the terminal holder set 3. The electrically insulative terminal holder block 32 fits the space defined in between the top cover shell 1 and the bottom cover shell 2. The electrically insulative terminal holder block 32 has tool holes 321 through which cutting tool means is inserted to cut off the material bar 311 during fabrication, and bonding holes 322 for the bonding of the top cover shell 1 and the bottom cover shell 2 (see FIGS. 1 and 2).

During fabrication of the adapter card, the terminal holder set 2 is set in between the top cover shell 1 and the bottom cover shell 3, and then the parts are bonded together by an ultrasonic heat sealing apparatus.

Further, coupling grooves (not shown) and coupling ribs 21 are respectively provided at the top cover shell 1 and the bottom cover shell 2 for quick connection of the top cover shell 1 with the bottom cover shell 2 before ultrasonic heat sealing process, i.e., the top cover shell 1 and the bottom cover shell 2 are fastened together by a tongue-and-groove joint before ultrasonic heat sealing process. Further, the adapter card has a protect tap 22 for write protection, a positioning strip 23 for quick positioning in a SD memory card insertion slot, and a conventional fool-proof structure.

Although a particular embodiment of the invention has been described in detail for purposes of illustration, various modifications and enhancements may be made without departing from the spirit and scope of the invention.

What is claimed is:

1. An adapter card for receiving a mini MMC memory card to form a SD memory card, comprising a bottom cover shell, a top cover shell covering said bottom cover shell, a terminal holder set mounted in between said top cover shell and said bottom cover shell, and a mini MMC memory card insertion slot formed in between said top cover shell and said bottom cover shell at one side, wherein:

said terminal holder set comprises an electrically insulative holder block, and a plurality of terminals mounted in said electrically insulative holder block, said terminals being formed integral with a material bar and bonded with said material bar to said electrically insulative holder block by insert-molding, said terminals being cut off from said material bar after insert-molding.

2. The adapter card as claimed in claim 1, wherein said electrically insulative holder block fits in between said top cover shell and said bottom cover shell, having a plurality of bonding holes for the bonding of said top cover shell and said bottom cover shell.

3. The adapter card as claimed in claim 1, wherein said top cover shell and said bottom cover shell are bonded together by an ultrasonic heat sealing apparatus.

4. The adapter card as claimed in claim 1, wherein said top cover shell and said bottom cover shell are fastened together by a tongue-and-groove joint.

* * * * *